US012038087B2

(12) United States Patent
Suzuki et al.

(10) Patent No.: US 12,038,087 B2
(45) Date of Patent: Jul. 16, 2024

(54) SLIDING COMPONENT

(71) Applicant: Eagle Industry Co., Ltd., Tokyo (JP)

(72) Inventors: Hiroshi Suzuki, Tokyo (JP); Yuichiro Tokunaga, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 36 days.

(21) Appl. No.: 17/908,690

(22) PCT Filed: Apr. 7, 2020

(86) PCT No.: PCT/JP2020/015743
§ 371 (c)(1),
(2) Date: Sep. 1, 2022

(87) PCT Pub. No.: WO2021/205555
PCT Pub. Date: Oct. 14, 2021

(65) Prior Publication Data
US 2023/0095849 A1  Mar. 30, 2023

(51) Int. Cl.
*F16J 15/34* (2006.01)
(52) U.S. Cl.
CPC .................. *F16J 15/3424* (2013.01)
(58) Field of Classification Search
CPC ...... F16J 15/34; F16J 15/3404; F16J 15/3408; F16J 15/3412; F16J 15/3424
See application file for complete search history.

(56) References Cited

U.S. PATENT DOCUMENTS

| | | | |
|---|---|---|---|
| 2003/0178781 A1 | 9/2003 | Tejima | |
| 2003/0189294 A1* | 10/2003 | Tejima | F16J 15/3424 277/399 |
| 2004/0080112 A1* | 4/2004 | Tejima | F16J 15/3404 277/306 |
| 2005/0212217 A1 | 9/2005 | Tejima | |
| 2009/0200749 A1* | 8/2009 | Teshima | F16J 15/3484 277/512 |

(Continued)

FOREIGN PATENT DOCUMENTS

CN  201916486 U  8/2011
JP  200 .- 343741 A  12/2003
(Continued)

OTHER PUBLICATIONS

Extended European Search Report dated Sep. 14, 2023, Application No. 20930551.5; 7 pages.
(Continued)

*Primary Examiner* — Gilbert Y Lee
(74) *Attorney, Agent, or Firm* — Rankin, Hill & Clark LLP

(57) ABSTRACT

A sliding component includes a pair of sliding members being slidable relative to each other on sliding surfaces of the sliding members. One of the sliding surfaces includes a dimple group in which dimples are arranged in a radial direction and a circumferential direction, each of the dimples having an opening portion whose shape has a long axis and a short axis orthogonal to the long axis. A dimple angle formed by a radial axis passing through an intersection of the long axis and the short axis of the dimple and a rotational center of the sliding surface and the long axis changes in at least one of the radial direction and the circumferential direction of the one of the sliding surfaces.

10 Claims, 8 Drawing Sheets

(56) References Cited

U.S. PATENT DOCUMENTS

| | | | |
|---|---|---|---|
| 2011/0233872 A1 | 9/2011 | Iguchi et al. | |
| 2019/0264737 A1* | 8/2019 | Itadani | F16C 33/741 |
| 2020/0224768 A1* | 7/2020 | Imura | F16J 15/34 |
| 2020/0332901 A1* | 10/2020 | Imura | F16J 15/3412 |

FOREIGN PATENT DOCUMENTS

| | | |
|---|---|---|
| JP | 2004-204935 A | 7/2004 |
| JP | 2005-180652 A | 7/2005 |
| JP | 2010-133496 A | 6/2010 |
| JP | 5456772 B2 | 4/2014 |

OTHER PUBLICATIONS

International Search Reported dated Jun. 23, 2020, Application No. PCT/JP2020/015743; English translation included, 4 pages.
Written Opinion of the International Searching Authority dated Jun. 23, 2020, Application No. PCT/JP2020/015743; 5 pages.
Japanese Office Action dated May 30, 2023 issued in corresponding Japanese application No. 2022-513757; Partial English translation included (9 pages).

* cited by examiner

SLIDING COMPONENT

TECHNICAL FIELD

The present invention relates to a pair of sliding components that slide relative to each other by sliding surfaces, for example, a mechanical seal, a sliding bearing, and other sliding components suitable for a sliding portion. In particular, the present invention relates to a sliding component including as a sealing ring or a bearing that is required to have fluid interposing between sliding surfaces to reduce friction and prevent fluid from leaking from the sliding surfaces.

BACKGROUND ART

As a sealing device configured to prevent leakage of sealed fluid, there is known a sealing device (for example, a mechanical seal) including a pair of sliding components that relatively slide on sliding surfaces. In such a sealing device, it is necessary to maintain favorable sealing performance while reducing sliding torque by forming a fluid lubrication film by the sealed fluid between the sliding surfaces. As one method for achieving favorable sealing performance and low sliding torque, there is known a technique of arranging a plurality of dimples in a sliding surface.

For example, it is known that favorable sealing performance and low sliding torque may be achieved by arranging dimples each including a circular opening portion in a sliding surface on a virtual circumference line having a center coincide with a rotation center of a sliding component. (For example, see Patent Literature 1).

In addition, it is also known that dimples each including an elongated track-shaped opening portion are arranged at a predetermined dimple angle θ, and a ratio L1/L2 of a dimple circumferential length L1 on a circle passing through a dimple center to a circumferential length L2 of a land portion between adjacent dimples on the same circle is set to 0.001≤L1/L2≤0.1, thereby optimally adjusting sealing performance and sliding torque of the dimples as a whole (see, for example, Patent Literature 2).

CITATION LIST

Patent Literature

Patent Literature 1: JP-A-2010-133496
Patent Literature 2: Japanese Patent No. 5456772

SUMMARY OF INVENTION

Technical Problem

In the technique of Patent Literature 1, even though favorable sealing performance and low sliding torque may be achieved under specific operating conditions, the favorable sealing performance and low sliding torque cannot be achieved in a wide rotation speed range.

In the technique of Patent Literature 2, since the dimple angle is fixed, even though leakage of sealed fluid and sliding torque may be reduced under specific operating conditions, favorable sealing performance and low sliding torque cannot be achieved in a wide rotation speed range.

An object of the present invention is, in a pair of sliding components that relatively slide on sliding surfaces, to provide the sliding components are capable of achieving favorable sealing performance and low sliding torque and when used in a wide rotation speed range.

Solution to Problem

In order to solve the above problem, a sliding component of the present invention is:
a pair of sliding members being slidable relative to each other on sliding surfaces of the sliding members.
At least one of the sliding surfaces includes a dimple group in which dimples are arranged in a radial direction and a circumferential direction, each of the dimples having a long axis and a short axis orthogonal to the long axis, and
a dimple angle formed by a radial axis passing through an intersection of the long axis and the short axis of the dimple and a center of the sliding surface, and the long axis changes in at least one of the radial direction and the circumferential direction of the sliding surface.

According to this feature, by changing the dimple angle in at least one of the radial direction and the circumferential direction, a suction effect and a dynamic pressure effect of the dimples constituting the dimple group may be changed, thus dimples suitable for various operating conditions may be arranged, and thus favorable sealing performance and low sliding torque may be achieved.

The sliding component according to the present invention is characterized in that
the dimple angle changes at a constant rate in the radial direction.

According to this feature, by changing the dimple angle of the dimples constituting the dimple group at the constant rate in the radial direction, the suction effect and the dynamic pressure effect of the dimples may be changed in the radial direction.

The sliding component according to the present invention is characterized in that
the dimple angle discontinuously changes in the radial direction.

According to this feature, by discontinuously changing the dimple angle in the radial direction, the suction effect and the dynamic pressure effect of the dimples constituting the dimple group may be discontinuously changed in the radial direction, and thus a dimple group suitable for operating conditions in a specific range may be arranged.

The sliding component according to the present invention is characterized in that
a rate of change in the dimple angle in the radial direction changes in the radial direction.

According to this feature, by changing, in the radial direction, the rate of change in the dimple angle in the radial direction, dimples suitable for respective use conditions may be easily arranged in the radial direction.

The sliding component according to the present invention is characterized in that
the dimple angle is larger on a leakage side of the sliding surface and smaller on a sealed fluid side of the sliding surface.

According to this feature, since the dimple angle of the dimples arranged on the leakage side is large, the suction effect becomes predominant, and thus the dimples may suction fluid from the leakage side so as to extremely reduce leakage. In addition, since the dimple angle of the dimples arranged on the sealed fluid side is small, the dynamic pressure effect becomes predominant, and thus the dimples may discharge high-pressure fluid so as to reduce sliding torque.

The dimple angle is characterized by changing at a constant rate in the circumferential direction.

According to this feature, by changing the dimple angle of the dimples constituting the dimple group at the constant rate in the circumferential direction, a fluid holding effect, the suction effect, and a sealing effect of the dimples may be changed in the circumferential direction.

The sliding component according to the present invention is characterized in that the dimple angle discontinuously changes in the circumferential direction.

According to this feature, by discontinuously changing the dimple angle in the circumferential direction, the suction effect and the dynamic pressure effect of the dimples constituting the dimple group may be discontinuously changed in the circumferential direction, and thus a dimple group suitable for operating conditions in a specific range may be arranged.

The sliding component according to the present invention is characterized in that a rate of change in the dimple angle in the circumferential direction changes in the circumferential direction.

According to this feature, by changing, in the circumferential direction, the rate of change in the dimple angle in the circumferential direction, dimples suitable for respective use conditions may be easily arranged in the radial direction.

The sliding component according to the present invention is characterized in that the sliding surface includes a plurality of regions defined by a land portion extending in the radial direction, and the dimple group is arranged in the regions.

According to this feature, dimples suitable for various operating conditions may be arranged in each region, and thus favorable sealing performance and low sliding torque may be achieved.

The sliding component according to the present invention is characterized in that the shape of the opening portion of the dimple is an ellipse.

According to this feature, by utilizing a difference in the suction effect and the dynamic pressure effect between a long axis direction and a short axis direction of each elliptical dimple, dimples suitable for various operating conditions may be arranged, and thus favorable sealing performance and low sliding torque may be achieved.

DESCRIPTION OF EMBODIMENTS

Hereinafter, modes for carrying out the present invention will be exemplified based on embodiments with reference to the drawings. However, unless otherwise specified, dimensions, materials, shapes, relative positions, and the like of components described in the embodiments are not intended to limit the scope of the present invention.

Embodiment 1

A sliding component according to Embodiment 1 of the present invention will be described with reference to FIGS. 1 and 2. In the following embodiment, a mechanical seal, which is an example of a sliding component, will be described as an example. However, the present invention is not limited thereto, and for example, the present invention may be used as a sliding component of a bearing that slides on a rotation shaft while sealing lubricating oil on one side in an axial direction of a cylindrical sliding surface. An outer peripheral side of the sliding component constituting the mechanical seal will be described as a sealed fluid side (a high-pressure fluid side), and an inner peripheral side will be described as a leakage side (a low-pressure fluid side, for example, an atmosphere side).

Figure 1:
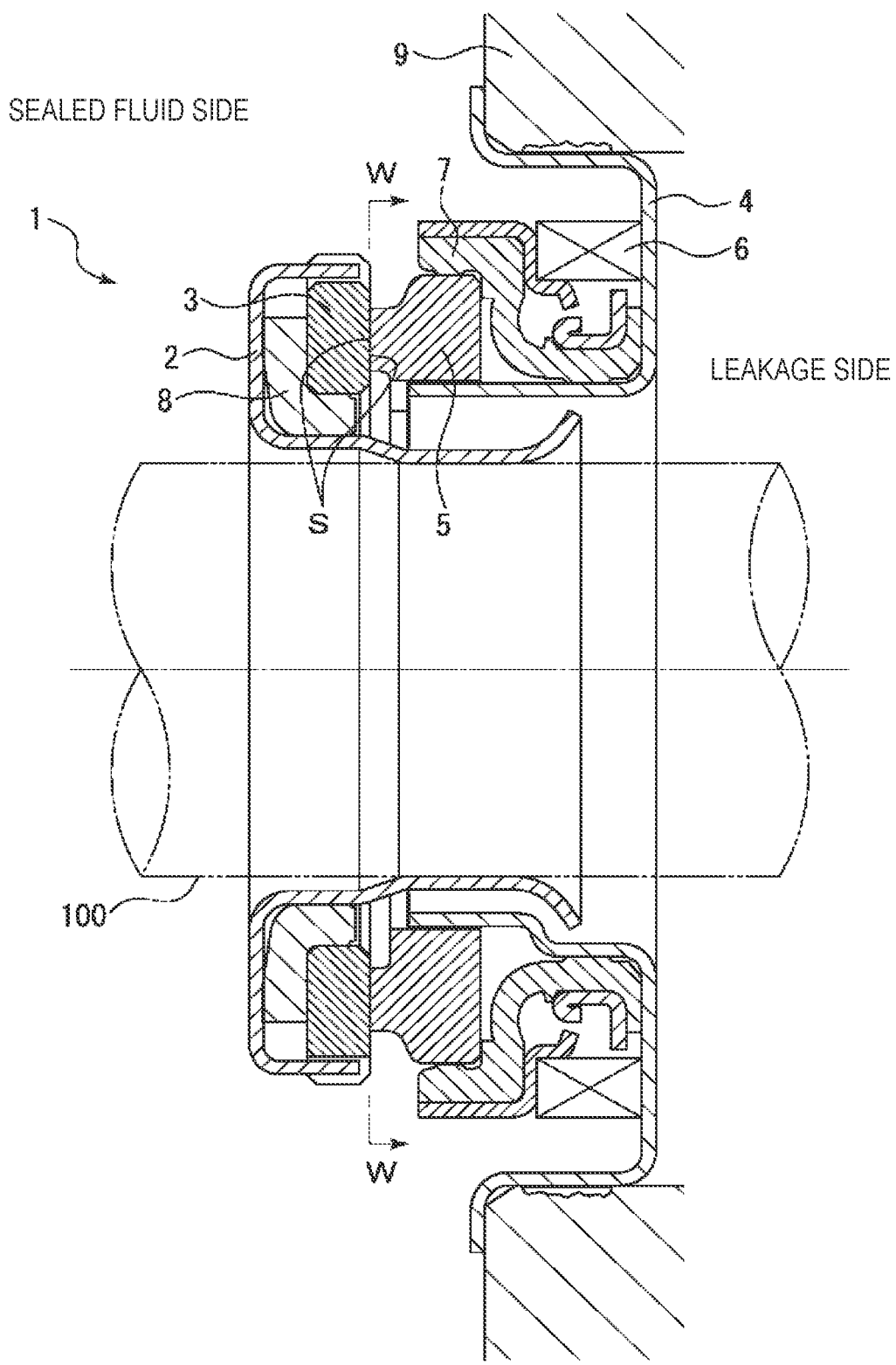
FIG. 1 is a vertical cross-sectional view showing an example in which a sliding component according to the present invention is applied to a mechanical seal.

FIG. 1 is a vertical cross-sectional view showing an example of a mechanical seal 1, which belongs to an inside type in which sealed fluid leaking from an outer periphery of a sliding surface S toward an inner peripheral direction is sealed, and includes a rotation-side cartridge and a fixed-side cartridge. The rotation-side cartridge includes a sleeve 2 fitted to a rotation shaft 100, an annular rotation-side sealing ring 3 that is one sliding component, and a packing 8 that seals space between the sleeve 2 and the rotation-side sealing ring 3. The rotation-side cartridge rotates together with the rotation shaft 100.

The fixed-side cartridge includes a housing 4 attached to a casing 9, an annular fixed-side sealing ring 5 that is another sliding component, a bellows 7 that seals space between the fixed-side sealing ring 5 and the housing 4, and a coiled wave spring 6 that urges the fixed-side sealing ring 5 toward the rotation-side sealing ring 3 via the bellows 7. The housing 4 is fixed to the casing 9 in a rotation direction and an axial direction.

In the mechanical seal 1 having the above configuration, the sliding surface S of the rotation-side sealing ring 3 and the sliding surface S of the fixed-side sealing ring 5 slide relative to each other so as to prevent the sealed fluid from flowing out from the outer peripheral side to the inner peripheral side. Although FIG. 1 shows a case where a width of the sliding surface of the rotation-side sealing ring 3 is wider than a width of the sliding surface of the fixed-side sealing ring 5, the present invention is not limited thereto, and it is needless to say that the present invention may also be applied in an opposite case.

Materials of the rotation-side sealing ring 3 and the fixed-side sealing ring 5 are selected from silicon carbide (SiC) that has good wear resistance, carbon that has good self-lubricating performance, and the like. For example, both of the rotation-side sealing ring 3 and the fixed-side sealing ring 5 may be made of SiC, or the rotation-side sealing ring 3 may be made of SiC while the fixed-side sealing ring 5 is made of carbon.

Figure 2:
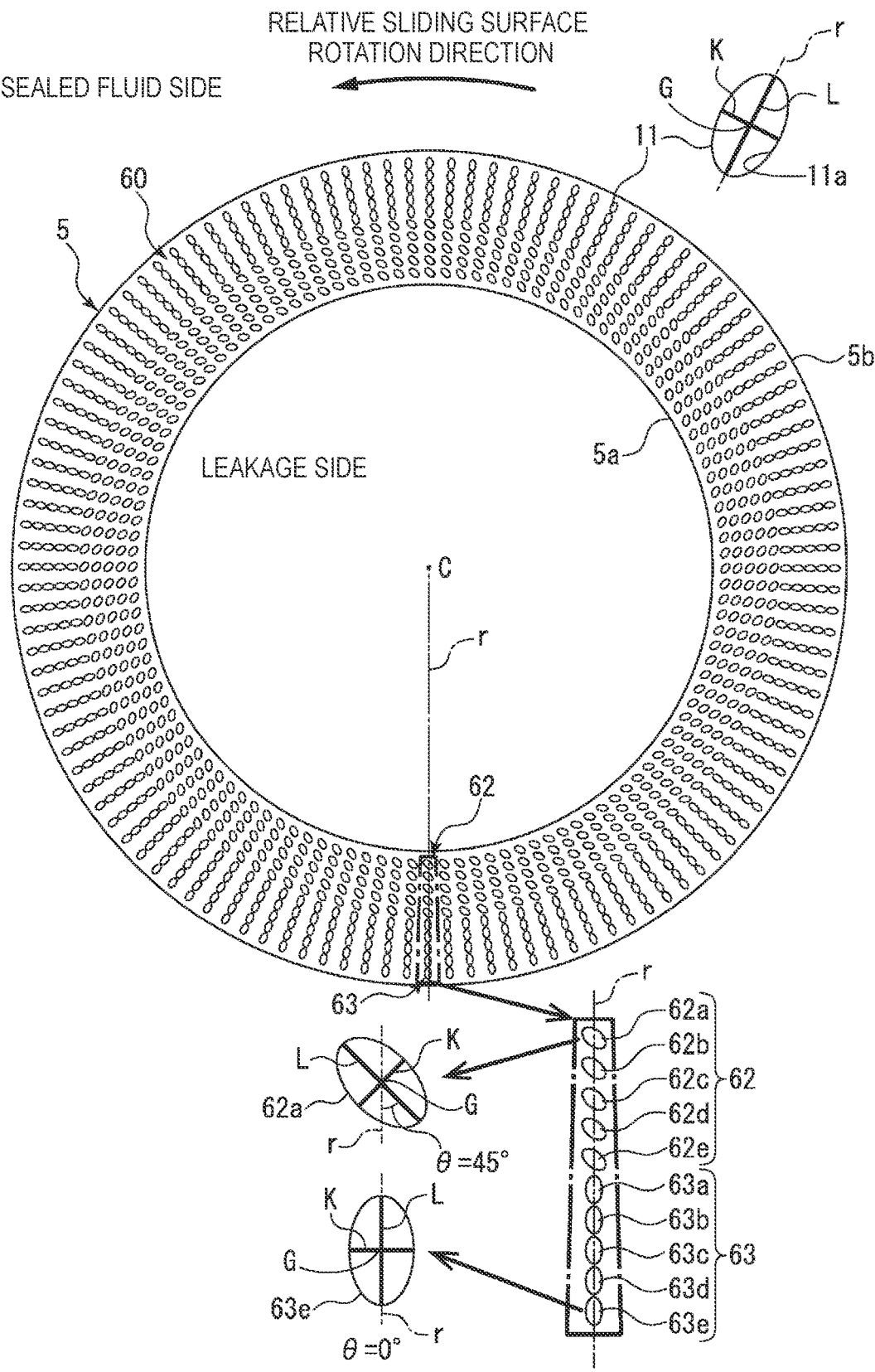
FIG. 2 is taken along line W-W of FIG. 1, which shows an example of a sliding surface of a sliding component according to Embodiment 1 of the present invention.

As shown in FIG. 2, the fixed-side sealing ring 5 includes a plurality of dimples 11. In the present invention, each dimple 11 is a recess that includes an opening portion 11a surrounded by the flat sliding surface S and a bottom portion that is recessed relative to the sliding surface S. The opening portion 11a of the dimple 11 has a shape having a long axis L and a short axis K orthogonal to each other. In addition, the dimples 11 are spaced apart from each other with land portions interposed therebetween. In the present invention, the long axis L is an imaginary line that passes through a centroid of the shape of the opening portion 11a and connects maximum width portions of the opening portion 11a while the short axis K is an imaginary line that passes through the centroid of the opening portion 11a and connects opposite portions of the opening portion 11a in a direction orthogonal to the long axis L. In the present embodiment, an example in which the opening portion 11a of the dimple 11 is an ellipse having the long axis L and the short axis K orthogonal to each other will be described. However, the shape is not limited to an ellipse, and may be an oval shape, a rhombus shape, a triangular shape, a rectangular shape, a polygonal shape, or any shape formed by closed curves 91, 92, 93, or 94 as shown in FIGS. 6A to 6D, as long as the shape has the long axis and the short axis orthogonal to each other.

Next, a function of each dimple 11 will be explained. When the fixed-side sealing ring 5 provided with the dimples 11 and the rotation-side sealing ring 3 facing the fixed-side sealing ring 5 are moved relative to each other, fluid between the sliding surfaces S and fluid in the dimples 11 are moved following a moving direction of the rotation-side sealing ring 3 due to viscosity of the fluid. Since a flow path of the fluid flowing into the dimple 11 rapidly expands, negative pressure is generated on an upstream side of the dimple 11, and thus cavitation occurs. However, since a magnitude of the negative pressure in the cavitation is limited by a value of fluid vapor pressure, the negative pressure does not become large. In addition, on a downstream side of the dimple 11, the fluid is pressurized to positive pressure by a wedge effect (dynamic pressure effect) due to rapid contraction of a flow path. Due to the negative pressure generated on the upstream side of the dimple 11, the dimple 11 exhibits a suction effect of suctioning surrounding fluid. On the other hand, on the downstream side of the dimple 11, the fluid pressurized by the wedge effect is supplied to the sliding surfaces S, and thus a fluid lubricating state is maintained between the sliding surfaces S.

A dimple angle will be explained. As shown in FIG. 2, a dimple angle θ is the angle between a radial axis r, which passes through a center C of the sliding surface S and an intersection (the centroid) of the long axis L and the short axis K of the dimple 11, and the long axis L.

In addition, a suction effect and a dynamic pressure effect of the dimple 11 are different depending on a magnitude of the dimple angle θ. When the dimple angle θ is 90°, that is, when the long axis L of the dimple 11 is arranged along a circumferential direction, a fluid holding function of the dimple 11 is improved. When the dimple angle θ is about 45°, the suction effect of the dimple 11 is improved. In addition, when the dimple angle is 0°, that is, when the long axis L of the dimple 11 is arranged along a radial direction, the dynamic pressure effect is improved. In this way, even when each dimple 11 has the same elliptical shape and the same depth, the suction effect and the dynamic pressure effect may be improved by arranging the dimples 11 while changing the dimple angle. Further, by changing the elliptical shape and the depth, dimples may have more diverse characteristics.

Next, a dimple group 60 will be explained. As shown in FIG. 2, the dimple group 60 is formed by arranging, at equal intervals in the circumferential direction, a predetermined number (120 in the example of FIG. 2) of sub dimple groups 62 and 63 that are arranged in a row in the radial direction. The sub dimple groups 62 are arranged in a row in the radial direction on one peripheral edge (on the leakage side) of the sliding surface S, while the sub dimple groups 63 are arranged in a row in the radial direction on the other peripheral edge (on the sealed fluid side) of the sliding surface. Dimples 62a, 62b, 62c, 62d, and 62e constituting each sub dimple group 62 arranged on the leakage side are arranged at the dimple angle θ of 45° each. In addition, dimples 63a, 63b, 63c, 63d, and 63e constituting each sub dimple group 63 arranged on the sealed fluid side are arranged at the dimple angle θ of 0° each. That is, the dimple angle θ of the sub dimple group 62 and the dimple angle θ of the sub dimple group 63 are set to discontinuously change in the radial direction.

Here, the dimples 62a, 62b, 62c, 62d, and 62e, and the dimples 63a, 63b, 63c, 63d, and 63e are formed to be ellipses whose opening portions have the same shape and depth. Although each of the sub dimple groups 62 and the sub dimple groups 63 is constituted by five dimples in the embodiment in FIG. 2, the present invention is not limited thereto. The number of dimples constituting each of the sub dimple groups 62 and the sub dimple groups 63 may be 5 or more, 5 or less, or may be different from each other. In addition, although the number of sub dimple groups 62 and the number of sub dimple groups 63 are 120 each on the sliding surface, the number may also be more than 120 or less than 120. Further, although the sub dimple groups 62 and 63 aligned in the radial direction are arranged at equal intervals in the circumferential direction, the sub dimple groups 62 and 63 may also be arranged at unequal intervals in the circumferential direction.

Since the dimples 62a, 62b, 62c, and 62d constituting each sub dimple group 62 are arranged at the dimple angle θ of 45°, the suction effect is predominant over the dynamic pressure effect in the dimples 62a, 62b, 62c and 62d, and thus the sub dimple group 62 as a whole exhibits a favorable suction effect. In addition, since the dimples 63a, 63b, 63c, and 63d constituting each sub dimple group 63 are arranged at the dimple angle θ of 0°, the dynamic pressure effect is predominant over the suction effect in the dimples 63a, 63b, 63c, and 63d, and thus the sub dimple group 63 as a whole exhibits a favorable dynamic pressure effect.

Therefore, by arranging the sub dimple group 62 having the favorable suction effect on the leakage side of the sliding surface, the sub dimple group 62 suctions fluid from the leakage side, and thus leakage may be extremely reduced. In addition, by arranging the sub dimple group 63 having the favorable dynamic pressure effect on the sealed fluid side of the sliding surface, the sub dimple group 63 supplies high pressure fluid to the sliding surface S, and thus sliding torque may be extremely reduced.

As described above, the sliding component of Embodiment 1 has the following effects.

1. Due to the negative pressure generated on the upstream side of the dimple 11, the dimple 11 exhibits the suction effect of suctioning surrounding fluid. On the other hand, since the fluid pressurized by the wedge effect is supplied to the sliding surface S on the downstream side of the dimple 11, the fluid lubricating effect of the sliding surface S is improved.

2. Since each dimple 11 has the elliptical opening portion having the long axis and the short axis orthogonal to each other, the suction effect and the dynamic pressure effect may be changed by changing the magnitude of the dimple angle θ. When the dimple 11 is arranged at the dimple angle θ of 90°, the dimple 11 has a favorable fluid holding function. When the dimple angle θ is about 45°, the suction effect of the dimple 11 is improved. In addition, at the dimple angle of 0°, the dynamic pressure effect of the dimple 11 is improved. In this way, even when each dimple 11 has the same elliptical shape, the suction effect and the dynamic pressure effect may be improved by arranging the dimples 11 while changing the dimple angle.

3. The sub dimple group 62 in which the dimples 11 are arranged at the dimple angle θ of about 45° has a favorable suction effect. Therefore, by arranging the sub dimple group 62 having the favorable suction effect on the leakage side of the sliding surface, the sub dimple group 62 suctions fluid from the leakage side, and thus leakage may be extremely reduced.

4. The sub dimple group 63 in which the dimples 11 are arranged at the dimple angle θ of about 0° has a favorable dynamic pressure effect. Therefore, by arranging the sub dimple group 63 having the favorable dynamic pressure effect on the sealed fluid side of the sliding surface, the sub dimple group 63 supplies high pressure fluid to the sliding surface S, and thus sliding torque may be extremely reduced.

5. By arranging the sub dimple group 62 having the favorable suction effect on the leakage side of the sliding surface, sealing performance may be improved. In addition, by arranging the sub dimple group 63 having the favorable dynamic pressure effect on the sealed fluid side of the sliding surface, sliding torque may be extremely reduced, and thus the dimple group 60 as a whole may achieve favorable sealing performance and low sliding torque. As a result, a sliding component having favorable sealing performance and low sliding torque may be achieved.

Embodiment 2

Figure 3:
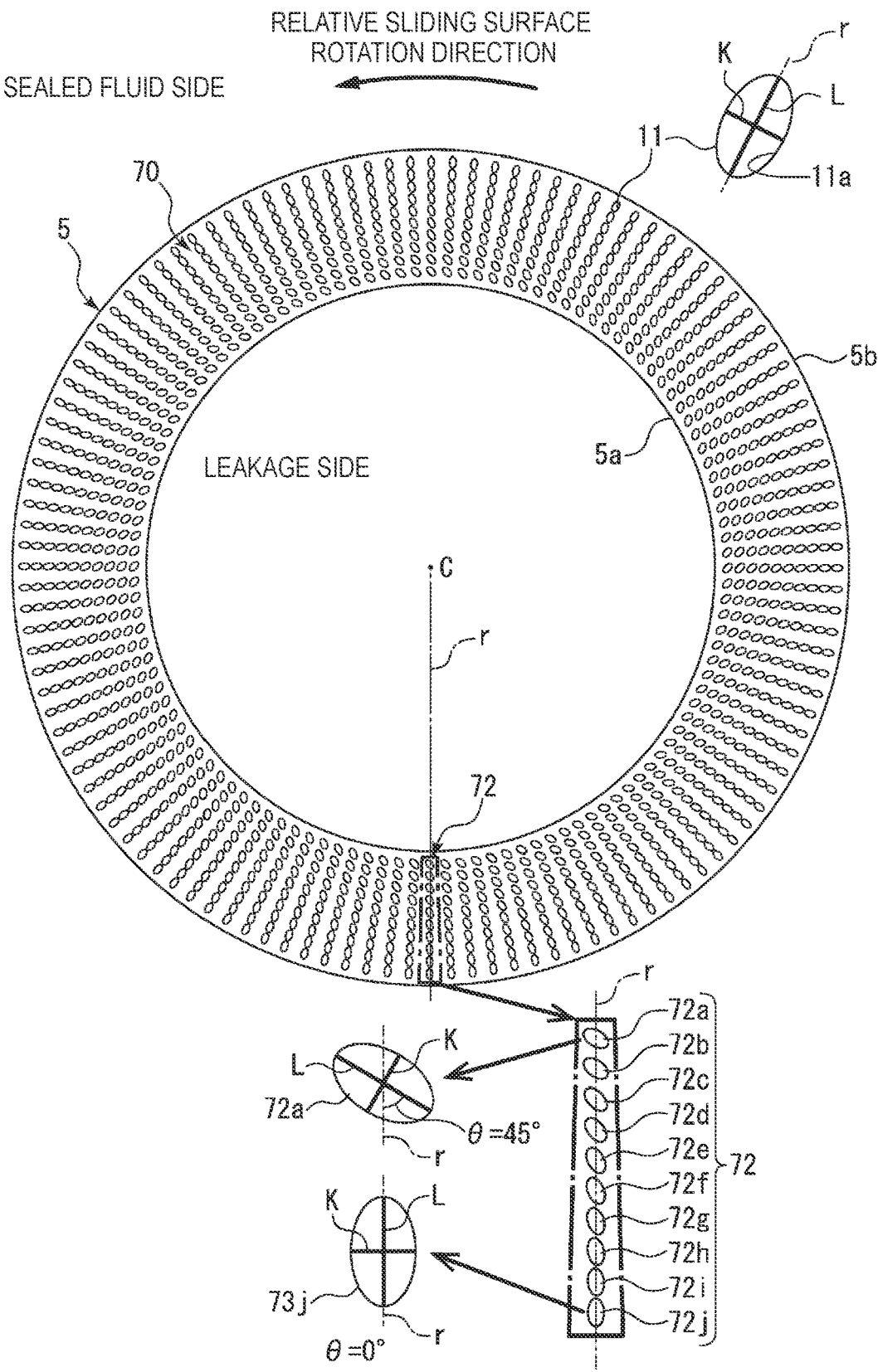
FIG. 3 is taken along line W-W of FIG. 1, which shows an example of a sliding surface of a sliding component according to Embodiment 2 of the present invention.

A sliding component according to Embodiment 2 will be described. FIG. 3 shows the sliding surface S of the sliding component according to Embodiment 2. In a dimple group 70 of Embodiment 2, the dimple angle θ changes at a constant rate in the radial direction, which is different from Embodiment 1. Hereinafter, the same members and configurations as those of Embodiment 1 will be denoted by the same reference numerals, and redundant description thereof will be omitted.

As shown in FIG. 3, the dimple group 70 is formed by arranging, at equal intervals in the circumferential direction, a predetermined number (120 in the example of FIG. 3) of sub dimple groups 72 that are arranged in a row in the radial direction. The sub dimple group 72 is formed by arranging dimples 72a, 72b, 72c, 72d, 72e, 72f, 72g, 72h, 72i, and 72j with land portions interposed therebetween in the radial direction. (Hereinafter, the dimples 72a, 72b, 72c, 72d, 72e, 72f, 72g, 72h, 72i, and 72j will be referred to as the "dimples 72a to 72j").

In the sub dimple group 72, the dimple 72a arranged on the leakage side of the sliding surface S is arranged at the dimple angle of 45°, and the dimple 72j arranged on the sealed fluid side of the sliding surface S is arranged at the dimple angle of 0°. Therefore, the dimple angle θ of the dimples 72a to 72i constituting the sub dimple group 72 changes from 45° to 0° at a constant rate in the radial direction from the dimple 72a toward the dimple 72j.

Even though the dimples 72a to 72j constituting the sub dimple group 72 are ellipses having the same shape, the dimple angles θ thereof are different from each other, and thus the suction effect and the dynamic pressure effect may be continuously changed. Among the dimples 72a to 72j constituting the sub dimple group 72, the dimple 72a arranged closer to a leakage-side peripheral edge 5a of the sliding surface has the dimple angle of 45°, and thus the suction effect is maximum. In addition, since the dimple angle decreases toward the sealed fluid side, the suction effect is gradually weakened, and the dynamic pressure effect of the dimple 72j arranged closer to a peripheral edge 5b on the sealed fluid side of the sliding surface is maximum.

Since the dimple angle of the dimples 72a to 72j constituting the dimple group 70 continuously changes at the constant rate in the radial direction, the suction effect and the dynamic pressure effect may be continuously changed. As a result, even when use conditions such as rotation speed and pressure are changed, there are dimples 72a to 72j suitable for the respective use conditions. As a result, the mechanical seal 1 may reduce leakage and may reduce sliding torque even when the use conditions are changed.

As described above, the sliding component of Embodiment 2 has the following effects in addition to the effects of Embodiment 1.

Since the dimple angle θ of the dimples 72a to 72j constituting the dimple group 70 continuously changes at the constant rate in the radial direction, the suction effect and the dynamic pressure effect may be continuously changed. As a result, even when use conditions such as rotation speed and pressure are changed, there are dimples 72a to 72j suitable for the respective use conditions. As a result, the mechanical seal 1 may reduce leakage and may reduce sliding torque even when the use conditions are changed.

Embodiment 3

Figure 4:
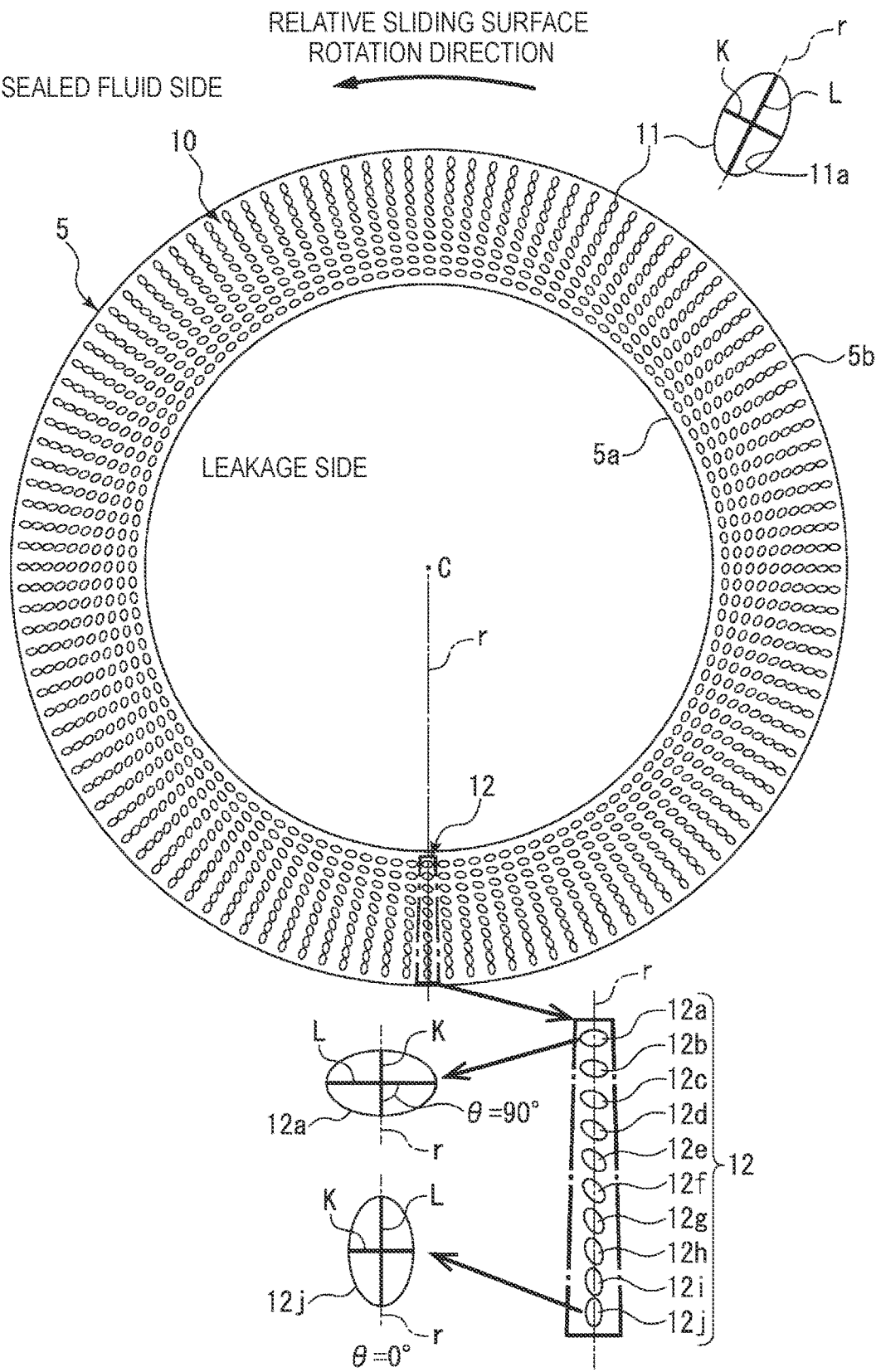
FIG. 4 is taken along line W-W of FIG. 1, which shows an example of a sliding surface of a sliding component according to Embodiment 3 of the present invention.

A sliding component according to Embodiment 3 of the present invention will be described. FIG. 4 shows the sliding surface S of the sliding component according to Embodiment 3, in which a dimple 12a having the dimple angle θ of 90° is arranged on the leakage side of the sliding surface S while a dimple 12j having the dimple angle θ of 0° is arranged on the sealed fluid side in a dimple group 10, which is different from Embodiment 2. Other configurations are the same as those of Embodiment 2. Hereinafter, the same members and configurations as those of Embodiment 2 will be denoted by the same reference numerals, and redundant description thereof will be omitted.

As shown in FIG. 4, the dimple group 10 is formed by arranging, at equal intervals in the circumferential direction, a predetermined number (120 in the example of FIG. 4) of sub dimple groups 12 that are arranged in a row in the radial direction. The sub dimple group 12 is formed by arranging dimples 12a, 12b, 12c, 12d, 12e, 12f, 12g, 12h, 12i, and 12j with the land portions interposed therebetween in the radial direction (hereinafter, the dimples 12a, 12b, 12c, 12d, 12e, 12f, 12g, 12h, 12i, and 12j are referred to as the "dimples 12a to 12j"). The dimple angle θ of the dimples 12a to 12j constituting the sub dimple group 12 changes from 90° to 0° at a constant rate in the radial direction from the dimple 12a on the leakage side toward the dimple 12j on the sealed fluid side. Here, shapes and sizes of ellipses of opening portions of the dimples 12a to 12j are substantially the same. The number of dimples constituting each sub dimple group 12 may also be more than or less than 10. In addition, the number of the sub dimple groups 12 arranged on the sliding surface S may also be more than 120 or less than 120.

Even though the dimples 12a to 12j constituting the sub dimple group 12 are ellipses having the same shape, the dimple angle θ of the dimples 12a to 12j constituting the sub dimple group 12 changes at the constant rate in the radial direction, and thus the suction effect and the dynamic pressure effect may be continuously changed. Specifically, when each dimple is arranged at the dimple angle θ of 90, the dimple has a favorable fluid holding function. When the dimple angle θ is about 45°, the suction effect of the dimple is improved. In addition, at the dimple angle of 0°, the dynamic pressure effect of the dimple is improved.

As a result, the dimples 12a, 12b, and 12c arranged on the leakage side where circumferential speed is low have the large dimple angle θ, and thus have a favorable fluid holding function. In particular, when operating at low rotation speed or when an inner diameter side of the sliding surface S where circumferential speed is low is likely to be in a poor lubrication state, the dimples 12a, 12b, and 12c having the dimple angle θ of 90° to 70° are arranged on the inner diameter side of the sliding surface S, and thus fluid held in the dimples 12a, 12b, and 12c may be supplied to the sliding surface S so as to prevent the poor lubrication state.

Since the dimples 12d, 12e, and 12f having the dimple angle θ of 45° are arranged in a central portion of the sliding surface S, the suction effect is improved. As a result, since fluid is suctioned into the dimples 12d, 12e, and 12f from the sealed fluid side, flow to the leakage side is prevented, and thus sealing performance may be improved.

In addition, since the dimples 12g, 12h, 12i, and 12j each having the small dimple angle θ are arranged on the sealed fluid side where circumferential speed is high, the dynamic pressure effect may be improved. As a result, the dimples 12g, 12h, 12i, and 12j arranged on the sealed fluid side where circumferential speed is high supply high-pressure fluid to the sliding surface S due to the dynamic pressure effect, and thus a fluid lubricating state may be maintained between the sliding surfaces S.

As described above, the sliding component of Embodiment 3 has the following effects in addition to the effects of Embodiment 1.

1. Even though the dimples 12a to 12j constituting the dimple group 10 are ellipses having the same shape, the dimple angle θ of the dimples 12a to 12j continuously changes at the constant rate in the radial direction, and thus the suction effect and the dynamic pressure effect may be continuously changed.

2. Since the dimples 12a, 12b, and 12c having the dimple angle θ of 90° to 70° are arranged on the leakage side where circumferential speed is low, the fluid holding function is improved. In particular, when operating at low rotation speed, the dimples 12a, 12b, and 12c having the favorable fluid holding function are arranged on the inner diameter side of the sliding surface S where circumferential speed is low, and thus fluid held in the dimples 12a, 12b, and 12c may be supplied to the sliding surface S so as to prevent a poor lubrication state.

3. Since the dimples 12d, 12e, and 12f having the dimple angle θ of 45° are arranged in the central portion of the sliding surface S, the suction effect is improved. As a result, since fluid is suctioned into the dimples 12d, 12e, and 12f from the sealed fluid side, flow to the leakage side is prevented, and thus sealing performance may be improved.

4. Since the dimples 12g, 12h, 12i, and 12j each having the small dimple angle θ are arranged on the sealed fluid side where circumferential speed is high, the dynamic pressure effect may be improved. As a result, the dimples 12g, 12h, 12i, and 12j arranged on the sealed fluid side where circumferential speed is high supply high-pressure fluid to the sliding surface S due to the dynamic pressure effect, and thus a fluid lubricating state may be maintained between the sliding surfaces S.

Embodiment 4

Figure 5:
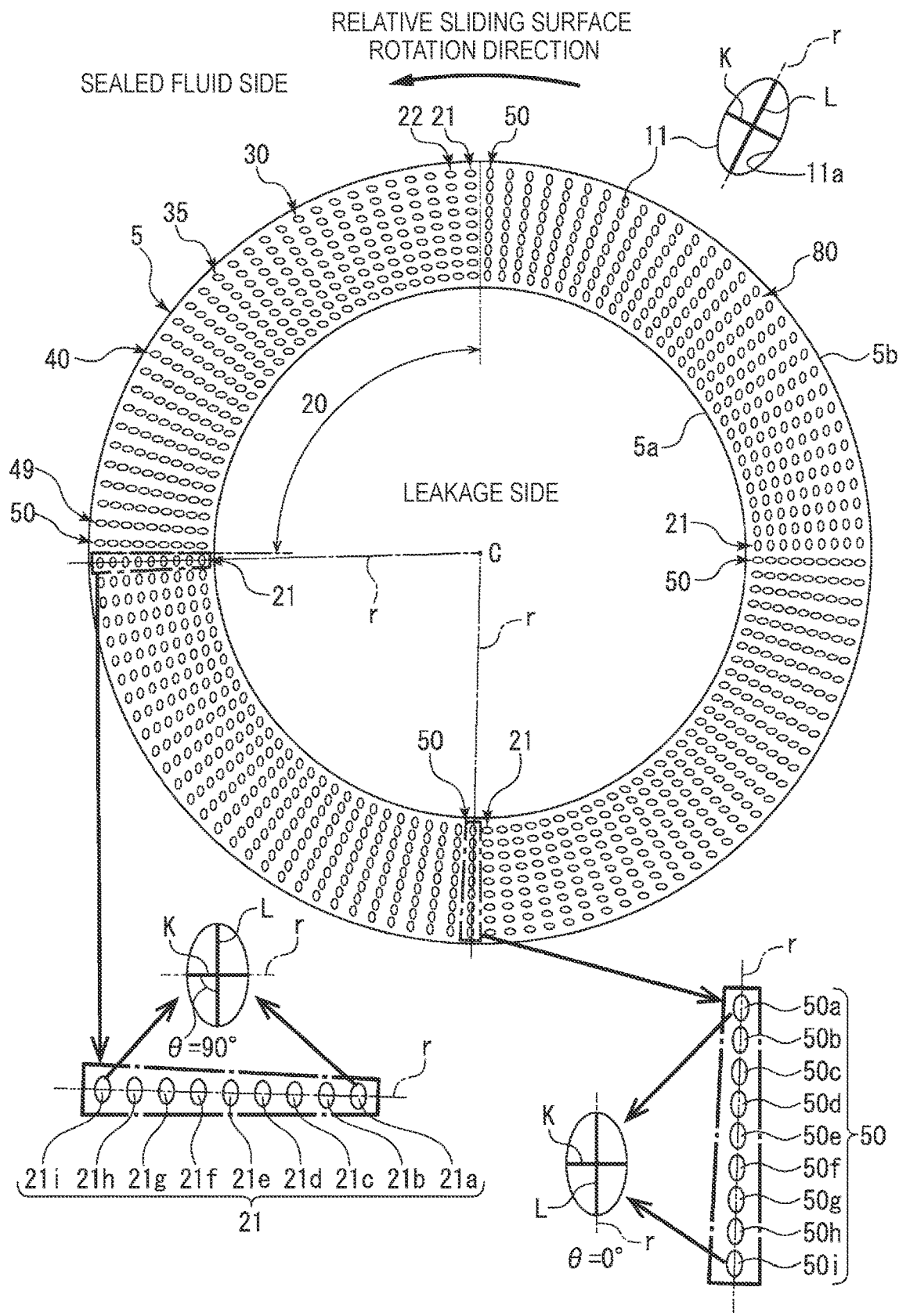
FIG. 5 is taken along line W-W of FIG. 1, which shows an example of a sliding surface of a sliding component according to Embodiment 4 of the present invention.
Figure 6A:
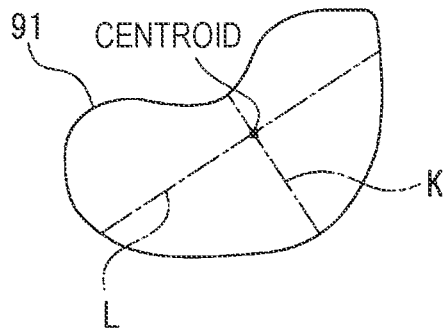
FIGS. 6A to 6D show other embodiments of a dimple of the present invention.
Figure 6B:
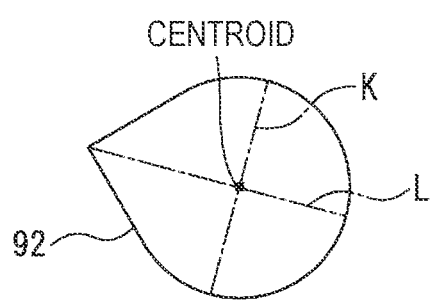
Figure 6C:
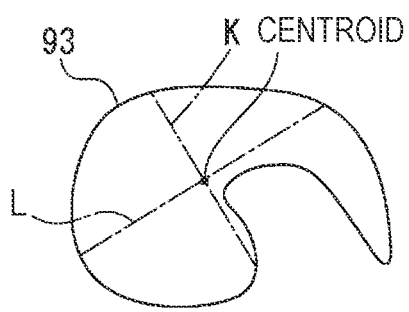
Figure 6D:
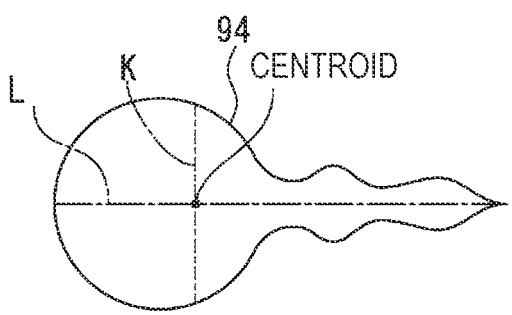

A sliding component according to Embodiment 4 of the present invention will be described. FIG. 5 shows the sliding surface S of the sliding component according to Embodiment 4 in which the dimple angle θ of dimples constituting each dimple group 80 is arranged to be constant in the radial direction and to continuously change in the circumferential direction, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 5, the sliding surface S of the fixed-side sealing ring 5 is partitioned into a predetermined number (four in the example of FIG. 5) of regions 20 by the land portions R provided from the sealed fluid side to the leakage side. The dimple groups 80 are arranged in the respective regions. In each dimple group 80, 30 sub dimple groups from a sub dimple group 21 to a sub dimple group 50 are arranged at equal intervals in the circumferential direction with the land portions interposed therebetween. In each of the sub dimple groups 21 to 50, 9 dimples are arranged at equal intervals in a row in the radial direction. Although 9 dimples are arranged in each of the sub dimple groups 21 to 50 in the embodiment in FIG. 5, the number is not limited thereto, and may also be more than 9 or less than 9. In addition, the number of sub dimple groups arranged in each region is not limited to 30, and may also be more than 30 or less than 30.

As shown in FIG. 5, the sub dimple group 21 is arranged at one end portion (on a rotation direction upstream side) of the region 20, while the sub dimple group 50 is arranged at the other end portion (on a rotation direction downstream side) of the region 20. The sub dimple group 21 is formed by arranging dimples 21a, 21b, 21c, 21d, 21e, 21f, 21g, 21h, and 21i (hereinafter referred to as the "dimples 21a to 21i") in a row from one peripheral edge (on the leakage side) to the other peripheral edge (on the sealed fluid side) of the sliding surface S with the land portions interposed therebetween. The dimple angle of the dimples 21a to 21i constituting the sub dimple group 21 is constant in the radial direction, that is, each of the dimples 21a to 21i has the dimple angle of 90°. In addition, the sub dimple group 50 is formed by arranging dimples 50a, 50b, 50c, 50e, 50d, 50f, 50g, 50h, and 50i (hereinafter referred to as the "dimples 50a to 50i") in a row from the leakage side to the sealed fluid side of the sliding surface S with the land portions interposed therebetween. The dimple angle of the dimples 50a to 50i is constant in the radial direction, that is, the dimple angle of the dimples 50a to 50i is arranged at the dimple angle of 0°. From the sub dimple group 21 toward the sub dimple group 50, the dimple angle of the dimples constituting the sub dimple groups 22 to 49 is arranged to change at a constant rate in the circumferential direction from the dimple angle θ of 90° to 0°.

Since the sub dimple group 21 having the dimple angle of 90° is arranged on the rotation direction upstream side of the region 20, a holding effect of holding fluid in the dimples is predominant over the suction effect and the dynamic pressure effect. In addition, since the sub dimple group 50 having the dimple angle of 0° is arranged on the rotation direction downstream side of the region 20, the dynamic pressure effect is predominant over the suction effect. Further, since the dimple group having the dimple angle of 45° is arranged in a middle flow region between the upstream side and the downstream side of the region 20, the suction effect is predominant. That is, since the dimple angle of the sub dimple groups 22 to 49 is arranged to change in the circumferential direction from the sub dimple group 21 toward the sub dimple group 50 from the dimple angle θ of 90° to 0°, dimple groups having different characteristics are evenly distributed from the sub dimple group 21 to the sub dimple group 50, thus dimple groups suitable for various operating conditions are arranged, and thus favorable sealing performance and low sliding torque may be achieved under the various operating conditions.

As described above, the sliding component of Embodiment 4 has the following effects.

1. Since the sub dimple group 21 having the dimple angle of 90° is arranged on the rotation direction upstream side of the region 20, the holding effect of holding fluid in the dimples is predominant over the suction effect and the dynamic pressure effect. In addition, since the sub dimple group 50 having the dimple angle of 0° is arranged on the rotation direction downstream side of the region 20, the dynamic pressure effect is predominant over the suction effect. Further, since the dimple group having the dimple angle of 45° is arranged in the middle flow region between the upstream side and the downstream side of the region 20, the suction effect is predominant.

2. Since the dimple angle of the dimple groups arranged in the circumferential direction of the region 20 changes in the circumferential direction, the fluid holding effect, the suction effect, and the sealing effect of the dimples may be continuously changed in the circumferential direction from the upstream side to the downstream side in the rotation direction. As a result, the dimple groups having different characteristics are evenly distributed from the sub dimple group 21 to the sub dimple group 50, thus dimple groups suitable for various operating conditions are arranged, and thus favorable sealing performance and low sliding torque may be achieved under the various operating conditions.

Although the embodiments of the present invention have been described above with reference to the drawings, the specific configuration is not limited to these embodiments, and changes and additions without departing from the spirit of the present invention are also included in the present invention.

FIGS. 7A to 7D show modifications of a manner in which the dimple angle θ changes in the radial direction of the sliding surface S. The dimple angle θ may be changed in the radial direction so as to meet required operating conditions.

Figure 7A:
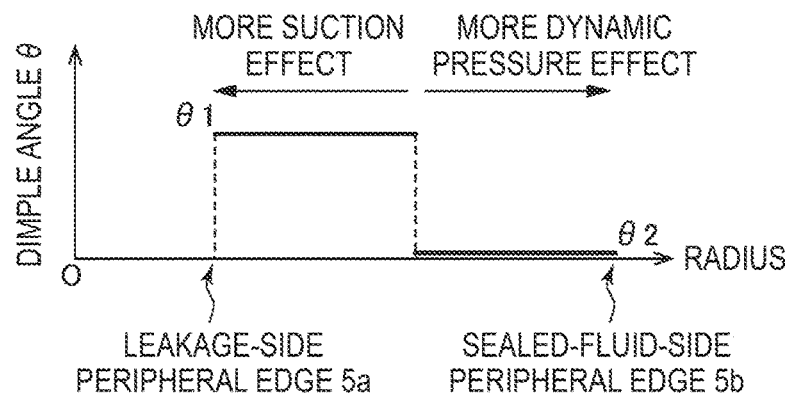
FIGS. 7A to 7D show modifications of a manner in which a dimple angle θ changes in a radial direction of a sliding surface S.

FIG. 7A corresponds to the embodiment of FIG. 2, and shows a case where the dimple angle discontinuously changes in the radial direction of the sliding surface S. The dimple angle θ of the dimples constituting the sub dimple group arranged on the leakage side of the sliding surface S and the dimple angle θ of the dimples constituting the sub dimple group arranged on the sealed fluid side of the sliding surface S are set to be different.

Figure 7B:
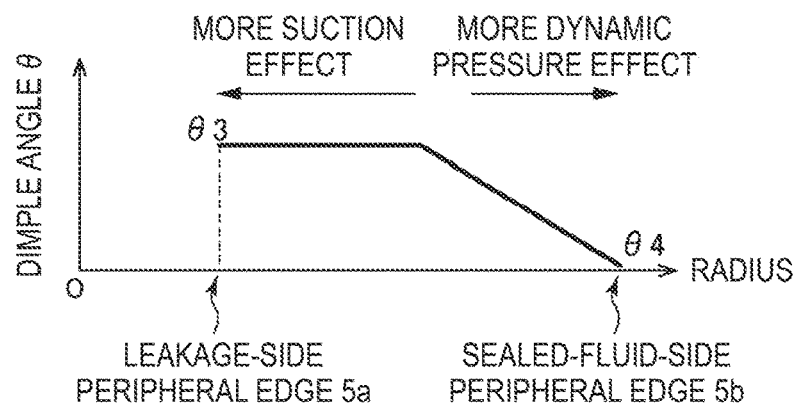

FIG. 7B is a modification of FIG. 7A, and shows a case where a rate of change in the dimple angle on the leakage side of the sliding surface is different from a rate of change in the dimple angle on the sealed fluid side of the sliding surface. The dimples constituting the dimple group arranged on the leakage side of the sliding surface S all have the constant dimple angle θ, and the dimple angle does not change, while the dimple angle θ of the dimples constituting the dimple group arranged on the sealed fluid side of the sliding surface S changes at a constant rate in the radial direction.

Figure 7C:
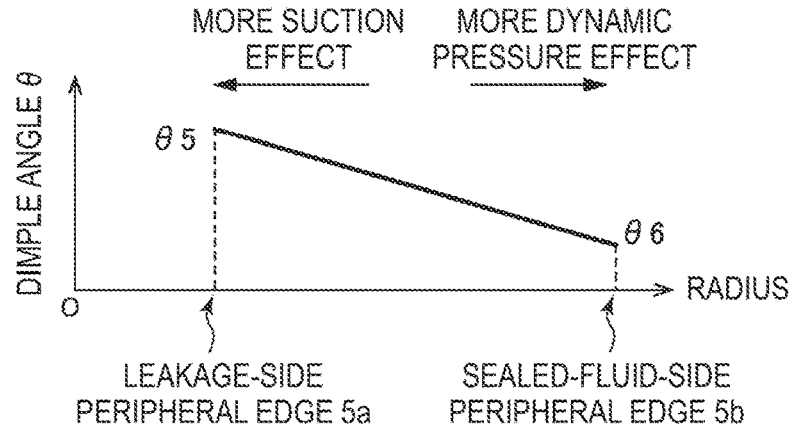

FIG. 7C corresponds to the embodiments of FIGS. 3 and 4, and the dimple angle θ of the dimples constituting the dimple group is set to change at a constant rate in the radial direction.

Figure 7D:
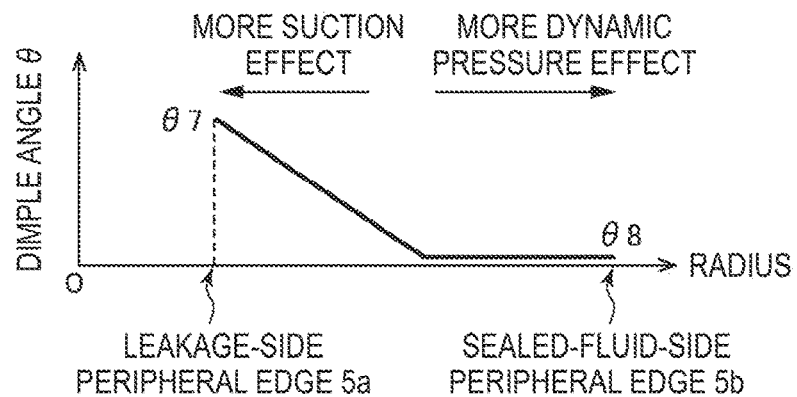

FIG. 7D shows a case where the rate of change in the dimple angle on the leakage side of the sliding surface is different from the rate of change in the dimple angle on the sealed fluid side of the sliding surface. The dimple angle θ of the dimples constituting the dimple group arranged on the leakage side of the sliding surface S changes at a constant rate in the radial direction. On the other hand, the dimple angle θ of all the dimples constituting the sub dimple group arranged on the sealed fluid side of the sliding surface S has the constant dimple angle θ, and the dimple angle does not change.

FIGS. 8A to 8D show modifications of a manner in which the dimple angle θ changes in the circumferential direction of the sliding surface S. The dimple angle θ may be changed in the circumferential direction so as to meet required operating conditions.

Figure 8A:
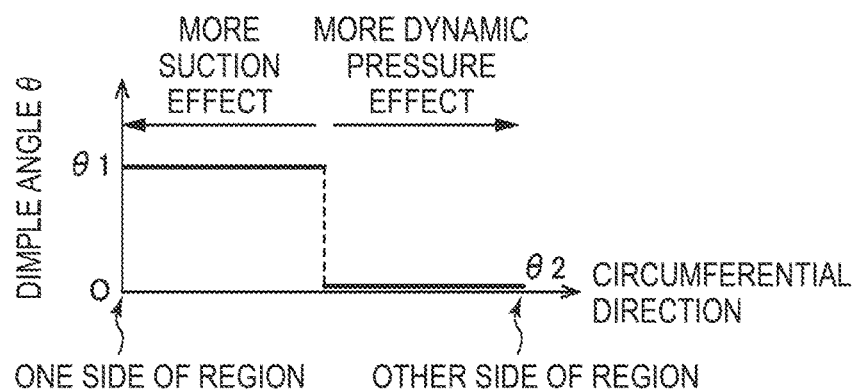
FIGS. 8A to 8D show modifications of a manner in which the dimple angle θ changes in a circumferential direction of the sliding surface S.

FIG. 8A shows a case where the dimple angle discontinuously changes from one side to the other side in a region provided along the circumferential direction of the sliding surface.

Figure 8B:
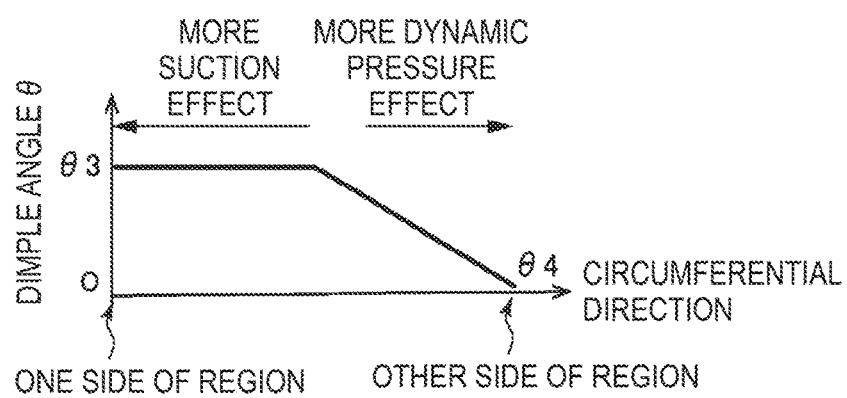

FIG. 8B shows a case where the rate of change in the dimple angle on the one side of the region is different from the rate of change in the dimple angle on the other side of the region.

Figure 8C:
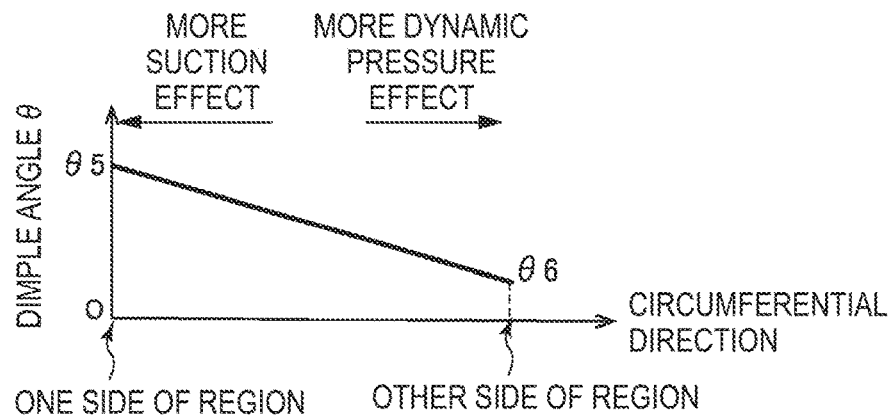

FIG. 8C corresponds to the embodiment of FIG. 5, and shows a case where the dimple angle changes at a constant rate in the circumferential direction.

Figure 8D:
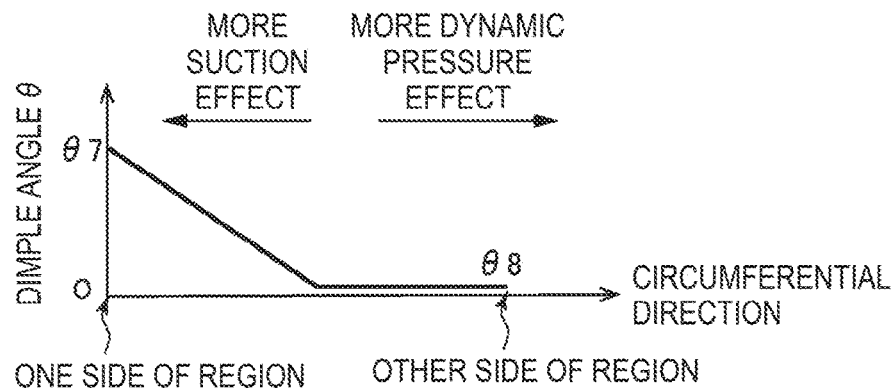

FIG. 8D shows a case where the rate of change in the dimple angle on the one side of the region is different from the rate of change in the dimple angle on the other side of the region.

In Embodiments 1 to 3, the dimple angle of the dimples constituting the dimple group changes in the radial direction and is constant in the circumferential direction. In addition, in Embodiment 4, the dimple angle of the dimples constituting the dimple group changes in the circumferential direction and is constant in the radial direction. However, the present invention is not limited thereto, and the dimple angle of the dimples constituting the dimple group may also be set to change in the radial direction and the circumferential direction so as to meet required operating conditions.

Although the dimples 11 constituting the dimple group have the same shape, size, and depth in the above embodiment, at least one of shapes, sizes, and depths of adjacent dimples may be different from each other. In addition, the shapes, sizes, and depths of the dimples may be different for each sub dimple group. By arranging dimples having different dimple angles as well as different dimple sizes, shapes, sizes, and depths in the sliding surface S, it is possible to arrange dimples suitable for a wide range of operating conditions in the sliding surface S, and thus it is possible to provide a sliding component having favorable sealing performance and small sliding torque corresponding to a wide range of operating conditions.

Although the outer peripheral side is the sealed fluid side while the inner peripheral side is the leakage side, the present invention is not limited thereto, and the present invention is also applicable to a case where the inner peripheral side is the sealed fluid side while the outer peripheral side is the leakage side.

REFERENCE SIGNS LIST 1 mechanical seal
2 sleeve
3 rotation-side sealing ring
4 housing
5 fixed-side sealing ring
5a leakage-side peripheral edge
5b sealed-fluid-side peripheral edge
6 coiled wave spring
7 bellows
8 packing
9 casing
100 rotation shaft
10 dimple group
11 dimple
11a opening portion
12 sub dimple group
12a dimple
12b dimple
12c dimple
12d dimple
12e dimple
12f dimple
12g dimple
12h dimple
12i dimple
12i dimple
12j dimple
20 region
21 sub dimple group
21a dimple
21b dimple
21c dimple
21d dimple
21e dimple
21f dimple
21g dimple
21h dimple
21j dimple
22 dimple group
30 sub dimple group
40 sub dimple group
49 sub dimple group
50 sub dimple group
50a dimple
50b dimple
50c dimple
50d dimple
50e dimple
50f dimple
50g dimple
50h dimple
50j dimple
60 dimple group
62 sub dimple group
62a dimple
62b dimple
62c dimple
62d dimple
62e dimple
63 sub dimple group
63a dimple
63b dimple
63c dimple
63d dimple
63e dimple
70 dimple group
72 sub dimple group
72a dimple
72b dimple
72c dimple
72d dimple
72e dimple
72f dimple
72g dimple
72h dimple
72i dimple
72j dimple
80 dimple group
K short axis
L long axis
R land portion
S sliding surface
θ dimple angle

The invention claimed is:

1. A sliding component comprising a pair of sliding members being slidable relative to each other on sliding surfaces of the sliding members, wherein
   at least one of the sliding surfaces includes a dimple group in which dimples are arranged in a radial direction and a circumferential direction, each of the dimples having an opening portion a shape of which has a long axis and a short axis orthogonal to the long axis,
   in each dimple of the dimples, a dimple angle from 0 degrees to 90 degrees is formed by a radial axis passing through an intersection of the long axis and the short axis of the dimple and a rotational center of the at least one of the sliding surfaces and the long axis of the dimple, and
   the dimples are formed so that the dimple angles of the dimples change in the radial direction of the at least one of the sliding surfaces, so that the dimple angle of a dimple of the dimples nearer the leakage side of the at least one of the sliding surfaces is larger than the dimple angle of a dimple of the dimples nearer the sealed fluid side of the at least one of the sliding surfaces in the radial direction.

2. The sliding component according to claim 1, wherein a rate of change in the dimple angle between each adjacent pair of dimples in the radial direction is constant.

3. The sliding component according to claim 1, wherein the dimple angles of the dimples discontinuously change in the radial direction.

4. The sliding component according to claim 3, wherein the dimple angle of each dimple in a first section from the leakage side to an intermediate position in the radial direction is a first constant angle and the dimple angle of each dimple in a second section from the intermediate position to the sealed fluid side is a second constant angle different form the first constant angle.

5. The sliding component according to claim 1, wherein a rate of change in the dimple angle between each adjacent pair of dimples in the radial direction changes.

6. The sliding component according to claim 1, wherein the one of the sliding surfaces includes a plurality of regions defined by a land portion extending in the radial direction, and the dimple group is arranged in the regions.

7. The sliding component according to claim 1, wherein the shape of the opening portion of each of the dimples is an ellipse.

8. The sliding component according to claim 1, wherein a rate of change in the dimple angle between each adjacent pair of dimples in the radial direction is constant from a dimple of the dimples nearest the leakage side to a dimple of the dimples nearest the sealed fluid side.

9. The sliding component according to claim 8, wherein the dimple angle of the dimple of the dimples nearest the leakage side is 90 degrees, the dimple angle of the dimple nearest the sealed fluid side is 0 degrees, and the dimple angles of each of the dimples between the dimple nearest the leakage side and the dimple nearest the sealed fluid side change at the constant rate of change relative to adjacent dimples of the dimples.

10. The sliding component according to claim 1, wherein the dimple angle of a dimple of the dimples nearest the leakage side is 90 degrees, the dimple angle of a dimple of the dimples nearest the sealed fluid side is 0 degrees, and the dimple angles of each of the dimples between the dimple nearest the leakage side and the dimple nearest the sealed fluid side increase from the dimple nearest the sealed fluid side to the dimple nearest the leakage side.

* * * * *